US006661803B1

(12) United States Patent
Choi et al.

(10) Patent No.: US 6,661,803 B1
(45) Date of Patent: *Dec. 9, 2003

(54) NETWORK SWITCH INCLUDING BANDWIDTH CONTROLLER

(75) Inventors: Kam Choi, Tring (GB); Patrick Gibson, London (GB); Christopher Hay, South Harrow (GB); Gareth E Allwright, St Albans (GB)

(73) Assignee: 3Com Corporation, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/475,310

(22) Filed: Dec. 30, 1999

(30) Foreign Application Priority Data

Nov. 4, 1999 (GB) ............................................. 9926039

(51) Int. Cl.[7] ............................................. H04L 12/28
(52) U.S. Cl. ..................... 370/413; 370/357; 370/358; 370/386; 370/229; 370/391; 370/429; 710/29; 710/54
(58) Field of Search ................................ 370/229–236, 370/412, 428, 429, 413–419, 395.1–395.43; 710/29, 54

(56) References Cited

U.S. PATENT DOCUMENTS

| | | | |
|---|---|---|---|
| 5,604,867 A | | 2/1997 | Harwood |
| 6,094,435 A | * | 7/2000 | Hoffman et al. ............. 370/414 |
| 6,098,110 A | * | 8/2000 | Witkowski et al. ......... 709/249 |
| 6,108,306 A | * | 8/2000 | Kalkunte et al. ............ 370/235 |
| 6,122,251 A | * | 9/2000 | Shinohara .................... 370/231 |
| 6,285,658 B1 | * | 9/2001 | Packer ......................... 370/230 |
| 6,347,091 B1 | * | 2/2002 | Wallentin et al. ........... 370/437 |
| 6,412,000 B1 | * | 6/2002 | Riddle et al. ................ 709/224 |
| 6,418,118 B1 | * | 7/2002 | Hay et al. .................... 370/230 |
| 6,434,137 B1 | * | 8/2002 | Anderson et al. ........... 370/347 |
| 6,456,590 B1 | * | 9/2002 | Ren et al. .................... 370/229 |
| 6,493,315 B1 | * | 12/2002 | Simpson et al. |
| 6,496,478 B1 | * | 12/2002 | Choi et al. ................... 370/229 |

FOREIGN PATENT DOCUMENTS

| | | |
|---|---|---|
| EP | 0753950 A | 1/1997 |
| GB | 2280574 A | 2/1995 |
| GB | 2336076 A | 10/1999 |
| WO | WO98/09408 | 3/1998 |

* cited by examiner

*Primary Examiner*—Douglas Olms
*Assistant Examiner*—Van Nguyen
(74) *Attorney, Agent, or Firm*—Nixon & Vanderhye, P.C.

(57) ABSTRACT

A network switch includes a plurality of receive ports for receiving addressed data packets and a plurality of transmit ports for forwarding the addressed data packets and is responsive to data in the packets for directing received packets to the transmit ports. The switch includes, with respect to at least one transmit port, a bandwidth controller for at least one selected packet type. The bandwidth controller diminishes an aggregate count in response to the sizes of packets of the one type destined for the transmit port and continually augments the aggregate count at a selectable rate. The switch compares the aggregate count with a threshold and initiates a discard of packets of the one type before they can be forwarded from the transmit port so as to limit the proportion of available bandwidth occupied by packet so of the one type with respect to the transmit port.

7 Claims, 3 Drawing Sheets

NETWORK SWITCH INCLUDING BANDWIDTH CONTROLLER

FIELD OF THE INVENTION

The present invention relates to network devices and particularly to network switches for packet-based communication systems such as Ethernet networks and also to an improved method of operating such a network device or switch. The term 'switch' is intended to refer broadly to a device which receives addressed data packets at any of a multiplicity of physical 'ports' and which can internally switch those packets so that received packets are forwarded from one or more ports in response to the address data in the packet or modified forms of such address data.

BACKGROUND TO THE INVENTION

Broadly, switches of the kind to which the invention relates have a multiplicity of physical ports at which addressed data packets can be received. The data traffic, and therefore the occupancy of bandwidth, at any particular port may vary widely. Typically, a switch includes means for temporarily storing packets received by the input ports and means, hereinafter called for convenience 'output buffer', for the temporary storage of data packets before they are forwarded from a port. Such means might be constituted by individual FIFO stores, by respective allocated memory space within a dynamic random access memory or by other forms of memory. Normally the switch includes a forwarding database which is built up typically by the reading of source addresses in incoming packets. The forwarding database permits, from an examination of a received packet and from recourse to associated data, the determination of the or each port from which a received packet should be dispatched. Packets having destination addresses which do not appear in the database need to be 'broadcast' either throughout the whole of the network or part of it in order to achieve resolution of the address. Generally, switches which rely on media access control, otherwise called 'layer 2', addresses are termed 'bridges' whereas switches which rely on logical link control, otherwise known as 'layer 3', addresses are normally termed 'routers'. In almost all switches of this general kind there is a conflict of bandwidths required for different types of packet. In any practical system the buffer space available for the transmitting ports of a switch is limited and accordingly switches in practice are inherently liable to congestion.

Various techniques are currently used to bridge and/or route data packets of different types. These techniques generally rely on the individual packets' protocols or priorities to influence the speed of transmission through the switch and/or to determine whether packets will be discarded if the device becomes congested. Generally, packets of higher priority experience the lower rate of discard.

In British patent application number 9807264.8 filed Apr. 3, 1998 (published as GB-2336076-A) and corresponding U.S. patent application Ser. No. 09/093,287 (Moran et al) there is described a mechanism for limiting the aggregate traffic through a port of a network device. The mechanism essentially comprises a counter which increments in accordance with the sizes of packets through the port and decrements at a rate which determines the maximum allowed data rate through the port. The decrementing rate may be remotely controlled by a network administrator. The traffic through the port is limited, if the content of the counter exceeds a threshold, by initiating 'flow control', that is to say the sending of control packets to the other end of the link to which the port is connected. These control packets are, in accordance with a known transmission standard, in a form which instructs the device at the far end of the link to cease sending packets for some period of time specified in the control packet. The proposal does not enable either any distinction to be made between packets of different type or the setting of a maximum bandwidth for traffic of a particular type.

The present invention particularly relates to an improved and more versatile technique for allocating a maximum bandwidth which may be occupied by packets of a particular type in an output link.

SUMMARY OF THE INVENTION

In a preferred form of the invention, bandwidth allocation for at least one defined packet type is achieved using a single buffer memory space. Different packet types are selected by for example snooping the protocol fields of packets and/or priority fields in the packets and categorising the packets according to the selection. For at least one and preferably each selected packet type there is a means which determines whether there are enough credits to store a new packet in the output buffer. Each time a new packet is accepted, a respective aggregate count is decremented by the size of the packet. Meanwhile, the aggregate count is constantly incremented at a selectable or controlled rate. In one embodiment of the invention, a counter may be incremented in response to a proportion of pulses corresponding to or defining the speed of a port. For example, if the desired maximum bandwidth to be occupied by packets of a selected type in an output link is to be 30% of the available bandwidth on that link, a counter for packets of that particular type may be incremented in response to three out of each ten successive clock pulses. Alternatively pulses corresponding to slot pulses for an internal slotted bus may be used if it is desired that the counting be independent of the speed of the port.

In an idle state, the counter may be incremented up to the allocation of the output buffer and may thereby store enough 'credits' for bursty traffic.

DETAILED DESCRIPTION OF A PREFERRED EMBODIMENT

Figure 1:
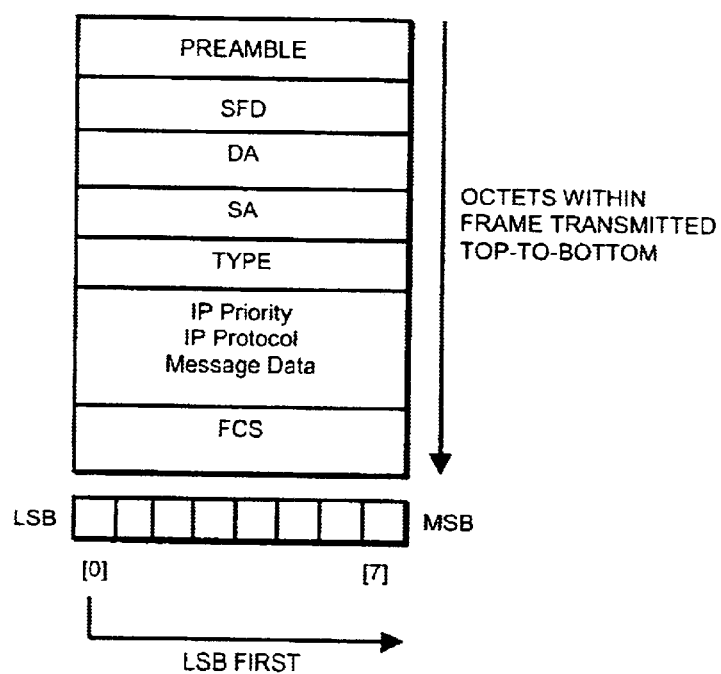
FIG. 1 illustrates a typical 'Ethernet' data packet.

FIG. 1 illustrates a typical 'Ethernet' data packet or frame of a kind which would be used by switches according to the invention. Such a packet is intended to conform, for example, to the IEEE Standard 802.3 (1998) but may conform to other and modified Standards if desired.

The data packet illustrated in FIG. 1 normally has a header comprising a preamble, a start of frame delimiter, a destination address, a source address, and type data, packet data comprising a protocol header and message data, and frame check sum (FCS) or cyclic redundancy code data at the end of the packet. Other forms of packet or frame which may be employed, such as control frames, may have special destination address codes and in place of the type data may have operation codes followed by control parameters. Control frames need not include message data but will normally include cyclic redundancy code data.

It is necessary in the present invention to sort, at some stage which will be described, packets into at least two categories, of which at least one category will be controlled to occupy a specified proportion of the bandwidth available for the forwarding of packets from an output buffer. There are many ways in which packets may be categorised and it is not intended to limit the invention to any particular group of categories or types or any particular method of characterisation. A few examples will suffice.

One example is to employ media access control priority bits and logical link control priority bits. According to one transmission Standard, particularly IEEE Standard 802.1p, there are three priority bits used to define priority in layer 2 addressing, the bits being located after the destination and source addresses and type field. The layer 3 priority bits are located in the layer 3 protocol header. These various priority bits may be combined using any suitable mapping algorithm to yield, for example, a three bit category field defining eight different categories. Each packet will fall into at least one category, it is not essential that the categories be mutually exclusive.

A second example of categorisation would be to employ different layer 3 protocols.

It may be desired to employ a 'higher level' categorisation, between, for example, audio, video and data traffic. Then the categorisation or filtration, these terms being broadly equivalent, needs to provide translation, for example by assigning different priorities to the different categories. However, such methods of categorisation are known in the art and are at the choice of the designer or dependent on the circumstances.

Figure 2:
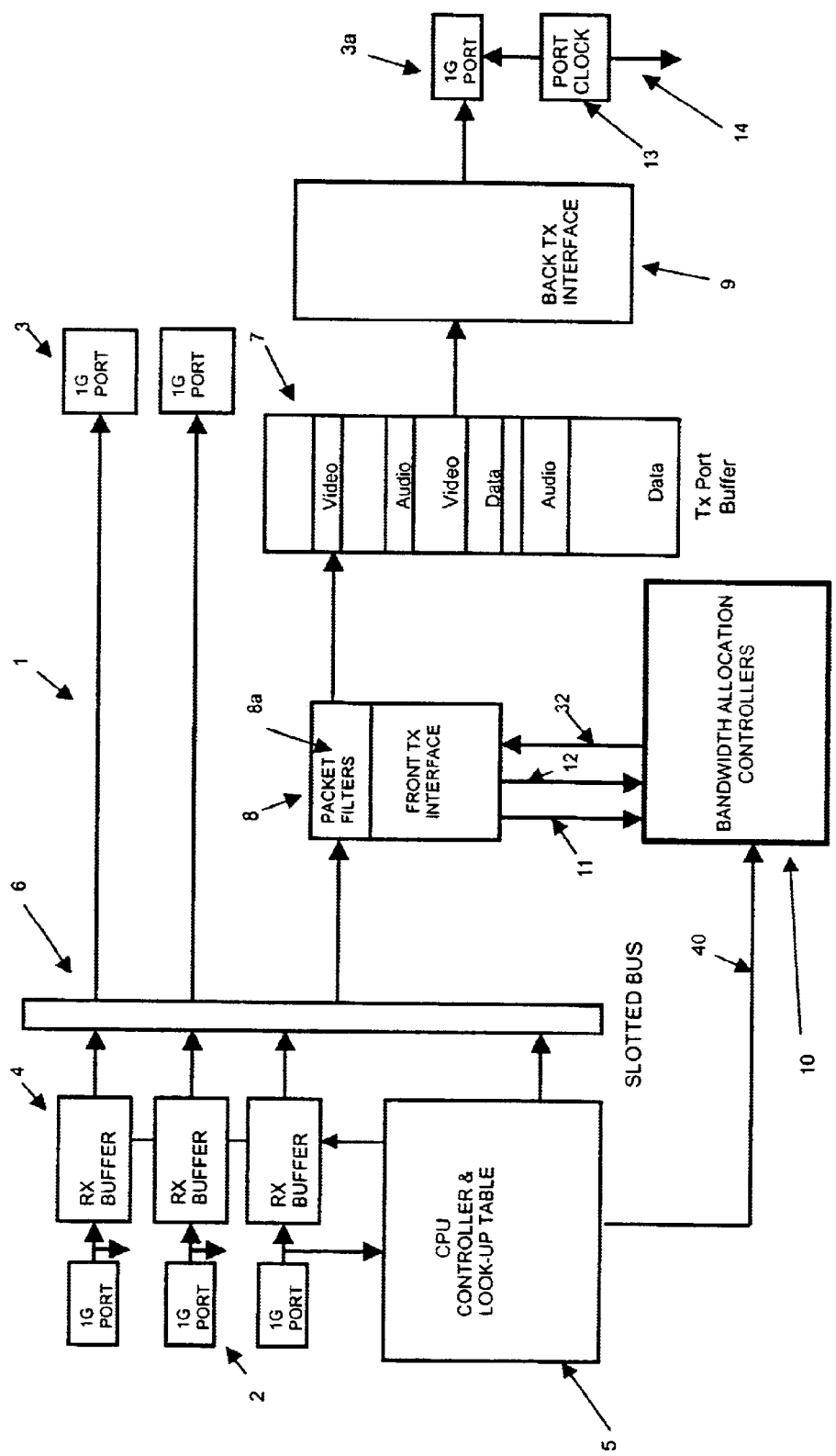
FIG. 2 illustrates schematically a switch architecture for a switch organised according to the invention.

FIG. 2 illustrates by way of example the architecture of a network switch 1 which is operable in accordance with the invention. The switch 1 has a set of ports 2 receiving addressed packets such as Ethernet packets as shown in FIG. 1. Only three such ports are shown, though very typically there would be many more ports than three. Typically the ports are capable of bidirectional operation, namely they can transmit as well as receive. The ports may he capable of half-duplex or full-duplex working according to preference or circumstances. For the sake of simplicity only the ports 2 are shown as receiving ports and further ports 3 are shown as transmitting ports. In this example, each of the ports is associated with a data link which, in this example, is assumed to have a maximum data rate.

In the present example it will be assumed that one of the ports, denoted 3a in FIG. 2, is required to provide over an associated link a fixed maximum bandwidth for at least one category of packet. As will be apparent, the invention is applicable in general to any reasonable multiplicity of different categories of data packets. Moreover, each of the other ports may be similarly provided with a bandwidth allocator of the kind to be described but for convenience the description will be limited to the allocation of a maximum bandwidth for a particular type of packet intended for transmission over the link associated with the transmit port 3a.

Before the characteristic features of the invention are described, the general architecture of the switch will be reviewed.

Packets received at each of the ports 2 are temporarily stored in receive buffers 4 from which they may be distributed to their destination ports by any convenient means. In this example the receive buffers 4 provide packets under the control of an access controller 5 to a time slotted data bus which provides equal access time for each of the receive buffers. From the data bus 6 packets are delivered to the transmitting ports as required. Packets intended for the port are directed to a respective buffer memory 7 which is under the control of a front interface 8 and a back interface 9. All the ports have allocated port numbers and the distribution of port numbers to packets can be achieved in known manner by the access controller S, which includes in known manner a CPU and a look-up table which associates the port numbers with destination addresses.

The organisation of the look-up table and the allocation of port numbers is not of any great consequence to the invention Typically, a hashing algorithm may be applied to at least part of the address data in the received packets and preferably to a combination of the source address and the destination address in each packet. The hashing of the source and destination addresses will provide a pointer to an entry or to a series of linked entries in a look-up table, which typically contains entries each comprising at least a port number and usually the source and destination addresses for the purposes of verification and also a link pointer to other entries in the table obtained from different source and destination pairs but hashing to the same result. If a verification process made on an entry does not achieve a match of address data the next entry in a linked list can be examined and so on. This process is typical of look-ups for forwarding tables based on hashing of addresses and does not need to be described in further detail. One example of hashing addresses is described in U.S. Pat. No. 5,708,659, issued to Rostoker et al on Jan. 13, 1998.

In any event, those packets which are allotted port numbers corresponding to any of the ports 3 or 3a will after leaving the relevant receive buffer be conveyed across the switch by way of the slotted bus 6 to the relevant ports.

The memory space 7 may be a respective memory for the port but may be constituted by respectively allocated buffers in a large buffer store, constituted for example by dynamic random access memory. The front transmit interface 8 controls the writing of data into the available memory space in the buffer whereas the back interface 9 controls the read out of packets from the buffer.

It needs to be stated that there is a variety of techniques available for the writing and reading of data packets in the output buffer. For example, as described in Gibson et al., Ser. No. 09/353,149 filed Jul. 14, 1999 (assigned to the same assignee as the instant application) it is possible for the front interface 8 to form a multiplicity of transmit queues in the available data space, according to traffic type, and for the back interface to read out from each of the thereby defined transmit queues in turn. For simplicity it will be assumed that the front interface forms within the available space of the buffer a single queue of packets which will be read out from the buffer 7 by means of the back interface 9.

The invention is not limited to the specific architecture shown herein provided that there are, as indicated in FIG. 2, some means for forming the addressed data packets into at least one queue in output buffer space before the packets are transmitted by way of a respective port or group of trunked ports.

In the present embodiment the switch 1 includes, for each category of packet of which the allocated bandwidth is to be controlled, a respective bandwidth allocation controller 10 which is more particularly described with reference to FIG. 3 Each controller requires an indication of the size of each packet read into the buffer 7. For some types of packet, there is an inherent indication of packet size contained in the packet header. Other types of packet do not have such indication but it is customary for the receiving ports to determine the length of each packet and to provide for transmission across the switch with a packet, status information including the packet size. Such status information and protocol and/or priority data is provided to each bandwidth controller 10 by way of lines 11 and 12 for each packet intended for the output buffer 7.

Figure 3:
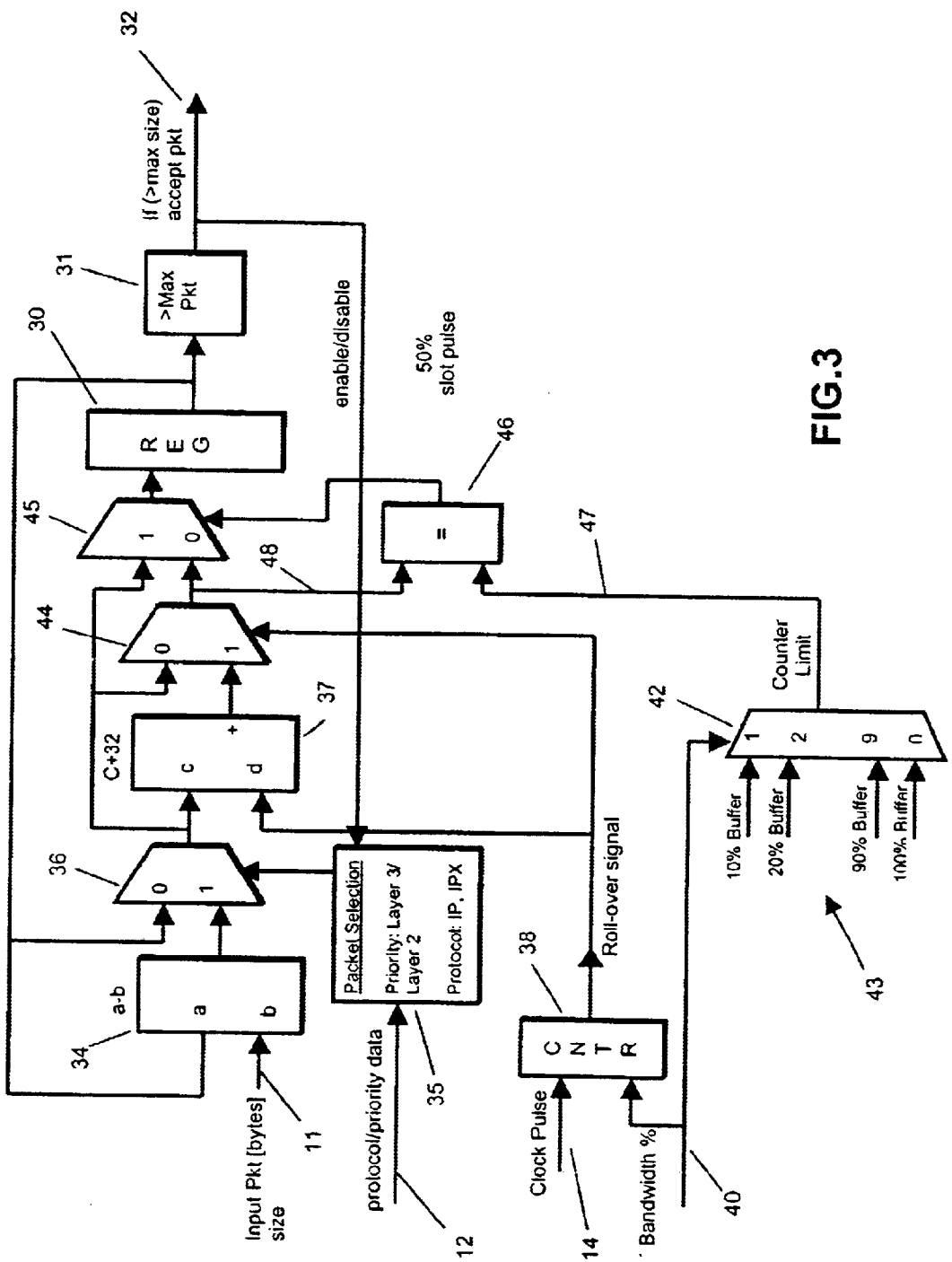
FIG. 3 illustrates one channel of a bandwidth allocator forming part of the switch illustrated in FIG. 2.

It needs to be mentioned, before FIG. 3 is discussed, that a front interface such as interface 8 normally includes a discarding function by which the interface is prevented from accepting any further packets under specified conditions.

Included within the front interface 8 are packet filters 8a, one for each of the different packet types, so that every packet which is destined for the output buffer 7 will be analysed by the different packet filters, to determine whether this packet is from its allotted group or not. These filters are controllable, as will be described, by the respective bandwidth controller, to discard packets of the respective type on receipt of a signal on a line 32

The present invention requires some form of clock pulse signal for the operation of a counter to be described with reference to FIG. 3. Such a signal may be derived from a clock signal for the slotted bus 6 but may, as shown, be derived from a clock 13 which g,governs the particular speed (i.e. data rate) of the respective port, i.e. port 3a. Clock 13 may be a slave clock driven from a system clock. An output 14 from the clock provides in this embodiment a clock input for a bandwidth controller as described with reference to FIG. 3.

FIG. 3 illustrates one of the bandwidth allocation controllers 10 for use in the switch shown in FIG. 2. There will be an allocation controller for each selected packet type for each port. As previously indicated, the bandwidth allocation controller maintains an aggregate count, which is decremented by the size of each packet of the respective type which arrives at the output buffer, and is continually incremented at a selected rate which limits the maximum bandwidth which may be occupied by the selected packet type. The aggregate count is held in a register 30, of which the content is compared with a threshold, preferably representing the maximum expected or permitted size of any packet, by means of a comparator 31. If the aggregate count in the register is greater than the threshold, there is produced on output line 32 a signal indicating that packets may continue to be accepted by the front interface 8. If the aggregate count in the register 30 is less than the threshold, the signal on line 32 to interface 8 indicates that packets of this type should be discarded.

An indication of packet size is provided to the controller on line 11, this line (in practice a multiplicity of parallel lines) being coupled to an input (b) of an 'subtractor' 34 which subtracts the input packet size from the current numerical content of the register 30.

A filter 35 responds to the protocol and/or priority data of the input packet to produce an enabling signal for a selector 36 if the respective packet is of the type that this controller 10 should be monitoring. If the packet is of the respective type, selector 36 passes on the aggregate count less the new packet size to input (c) of the adder 37. If the packet is not of the respective type, merely the prior aggregate count in register 30 is passed to the adder 37.

Counter 38 also receives on line 40 a control signal denoting the proportion of the maximum bandwidth which the respective type of packet should be occupying. Such a signal may be obtained by way of the CPU from a network adminstrator.

Control signal on line 40 controls counter 38 so that the counter counts the same proportion of clock pulses as the proportion of the bandwidth allocated to packets of the respective type. Thus for example if the proportion of the bandwidth allocated to packets of the respective type is 30%, the counter 38 will count three out of every ten slot pulses.

Control signal on line 40 also acts as a select input to a selector 42 which has inputs 43 each representing a respective counter limit for the relevant portion of bandwidth. In the present example, values are provided for each of ten discrete values of the proportion of bandwidth from 10% to 100%. These values may be held in registers which may be preprogrammed before use.

The counter 38 provides each time it counts to the number of pulses defined by the control on line 40 an enabling signal with (i) on the reception of input (d) of adder 37 increments the value at (c) by some fixed number, such as 32 (bytes); and (ii) enables a selector 44; this selector provides either the incremented count to a subsequent selector 45 or the non-incremented output of the selector 36, so that the aggregate count is incremented only if the counter 38 has made the defined count.

The output of selector 44 is coupled to one input of selector 45 of which the other input receives the output of selector 36. Selector 45 is controlled by the output of a comparator 46 which receives the counter limit value on line 47 and the output of selector 44 on line 48. On detection of equality, indicating that the aggregate count has reached the limit for the respective type in the buffer, comparator 46 provides switching signal to selector 45 so that the register 30 is not incremented past the limit for the respective packet type.

Otherwise however the aggregate count formed from the prior content of register 30 any decrementing value from the input packet and any incrementing value from the counter 38, the aggregate count is loaded back into the register 30 for comparison with the maximum packet size by means of comparator 31.

The discard signal on line 32 may also be employed to disable the packet selector 35 so that the aggregate count is not altered by any input packet if packets of that type are being discarded.

The incrementing and decrementing may be arranged conversely although some other alterations are necessary to ensure that the difference between the accumulated packet size and the accumulated slot pulse count is compared with an appropriate threshold to determine whether the allotted proportion of bandwidth has been occupied by the packets of respective type. In particular, the subtractor 34 could add the packet size to the aggregate count and the adder 37 may decrement the aggregate count in response to the counter 38. Then the comparator should produce a discard signal if the aggregate count exceeds an appropriate threshold. The comparator 46 would require analogous alteration.

In practice it may be feasible to combine the packet selectors 35 with the packet filters 8a so that selector 35 in FIG. 3 would be an AND function enabling selector 36.

What is claimed is:

1. A network switch comprising a plurality of receive ports for receiving addressed data packets and a plurality of transmit ports for forwarding the addressed data packets and means responsive to data in said packets for directing received packets to said transmit ports, said switch including in respect of at least one of said transmit ports:

a respective bandwidth controller for at least one selected packet type, said bandwidth controller including:

means for altering an aggregate count in a first sense in response to the sizes of packets of said one type destined for said one transmit port;

means for continually altering said aggregate count in a second sense opposite said first at a selectable rate;

means for making a comparison of said aggregate count with a threshold; and means responsive to said comparison for initiating discard of packets of said one type before they can be forwarded from said one transmit port such as to limit the proportion of available bandwidth occupied by packets of said one type in respect of said one transmit port.

2. A switch according to claim 1 wherein said means for altering comprises means for diminishing said aggregate count and said means for continually altering comprises means for augmenting said aggregate count.

3. A switch according to claim 1 wherein said means for continually altering said aggregate count comprises a counter, means for providing clock pulses and means for controlling the counter to count a selectable proportion of said clock pulses.

4. A switch according to claim 1 and further comprising means for limiting said aggregate count.

5. A network switch comprising a plurality of receive ports for receiving addressed data packets and a plurality of transmit ports for forwarding the addressed data packets and means responsive to data in said packets for directing received packets to said transmit ports, said switch including, in respect of at least one of said transmit ports:

a plurality of bandwidth controllers each for a respective selected packet type, each bandwidth controller including means for diminishing an aggregate count in a first sense in response to the sizes of packets of said respective type destined for said one transmit port;

means for continually augmenting said aggregate count in a second sense opposite said first at a selectable rate;

means for making a comparison of said aggregate count with a threshold; and means responsive to said comparison for initiating discard of packets of said respective type before they can be forwarded from said one transmit port such as to limit the proportion of available bandwidth occupied by packets of said one type in respect of said one transmit port.

6. A switch according to claim 5 wherein said means for continually augmenting said aggregate count comprises a counter, means for providing clock pulses and means for controlling the counter to count a selectable proportion of said clock pulses.

7. A switch according to claim 6 and further comprising means for limiting said aggregate count.

\* \* \* \* \*